United States Patent
Hector et al.

(10) Patent No.: US 7,142,267 B2
(45) Date of Patent: Nov. 28, 2006

(54) ACTIVE MATRIX DISPLAY DEVICE

(75) Inventors: Jason R. Hector, Redhill (GB); John R. Hughes, Horley (GB); Martin J. Edwards, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 855 days.

(21) Appl. No.: 10/205,553

(22) Filed: Jul. 25, 2002

(65) Prior Publication Data

US 2003/0030606 A1    Feb. 13, 2003

(30) Foreign Application Priority Data

Aug. 11, 2001   (GB)   ................................. 0119653.4

(51) Int. Cl.
   *G02F 1/133*   (2006.01)
(52) U.S. Cl. ............................. 349/73; 349/73; 349/74; 349/77; 349/81; 349/82; 349/83; 349/84; 349/143; 345/90; 345/91; 345/92; 345/93
(58) Field of Classification Search .................. 349/42, 349/73, 74, 77, 81, 82, 84, 143; 345/90, 345/91, 92
   See application file for complete search history.

(56) References Cited

U.S. PATENT DOCUMENTS 5,130,829 A    7/1992  Shannon ...................... 359/59
5,502,583 A *  3/1996  Sukegawa et al. ............ 349/42
6,496,238 B1 * 12/2002  Greene et al. ................ 349/73

OTHER PUBLICATIONS

R. Greene et al., "Manufacturing of Large Wide-View Angle Seamless Titled AMLCDs for Business and Consumer Applications", IDMC 2000, pp. 191-194.

* cited by examiner

*Primary Examiner*—Edward Coles
*Assistant Examiner*—Vu B. Hang

(57) ABSTRACT

An active matrix display device comprises an array of picture elements, e.g. liquid crystal picture elements, first and second sets of address conductors (16, 18) extending in row and column directions respectively and connected with the picture elements, and a set of connection conductor lines (30') extending in the same direction as one set of address conductors (18), each of which is connected to a respective one of the other set of conductors (16), and via which address signals are supplied to that other set. To avoid unwanted display artefacts, each connection conductor line (30') extends from one side of the array and terminates adjacent its connection point (32) to its associated address conductor (16) and a respective complementary conductor line (30") is provided which extends from close to the connection point (32) to the opposite side of the array, the complementary conductor line being electrically separate from the connection line (30') and coupled to reference signal supply (40).

20 Claims, 5 Drawing Sheets

ACTIVE MATRIX DISPLAY DEVICE

The present invention relates to active matrix display devices and more particularly active matrix display devices having a row and column array of picture elements, each comprising a picture element electrode and an associated switching element, carried on a support, first and second sets of address conductors connected to the picture elements and extending in the row and column directions respectively through which the picture elements are addressed, and a set of connection conductor lines carried on the support, each of which extends in the direction of, and between, a respective adjacent pair of the address conductors of one set and is connected to a respective one of the other set of address conductors, and via which addressing signals are supplied to the other set of address conductors.

An example of an active matrix liquid crystal display device (AMLCD) of this kind, and suitable for use in, for example, portable applications such as mobile telephones, camera viewfinders, electronic personal organisers and the like, is described in European Patent Application No. 01200466.9 (PHNL 010074). In this device, each connection conductor line extends from one side of the array to the opposite side and is connected to the associated address conductor at a position along its length where it extends over that conductor.

The provision of the set of connection conductor lines connected to one of the sets of address conductors enables the addressing signals for driving the picture elements, comprising selection (scanning) signals applied to the row address conductors and display data signals applied to the column address conductors, to be supplied at either a common side of the support or at opposing, parallel, sides of the support rather than at two mutually perpendicular sides as in conventional AMLCDs and the like. Typically in a conventional AMLCD a set of row address conductors, carrying the selection signals, and a set of column address conductors, carrying the data signals, each extend over a rectangular support beyond the area of the array of picture elements electrodes, defining the device's display area, to respective peripheral regions of the support on which they are carried, and comprising two adjacent, edge parts of the support, for the purpose of enabling electrical contact to be made with the sets of address conductors. For example, row and column drive circuit ICs may be directly mounted on these peripheral border regions of the support with their output terminals connected to the extended address conductors or, alternatively, may be mounted on foil with their output terminals connected to the address conductors via tracks on the foil. Using the set of connection conductor lines in the aforementioned manner enables the ICs to be provided instead either at a common peripheral border region along just the side of the support or at respective peripheral border regions along opposing, parallel, sides of the support, or alternatively for foil connections to be made at such parts.

As described in the aforementioned application, this feature can be used, for example, to enable the effective display area for a given size of support to be increased in one dimension, which is of benefit when the display device is used in small portable products. A similar kind of connection scheme is described in the paper by R. Greene et al entitled "Manufacturing of Large Wide-View Angle Seamless Tiled AMLCDs for Business and Consumer Applications", IDMC 2000, pages 191–194. The benefit in this case is that facilitate tiling of individual display panels is facilitated by allowing the address conductors to be driven from just one edge.

It has been found, however, that the operational characteristics of such display devices can be affected adversely by the presence of the connection conductor lines. In particular, it has been found that the display device can suffer picture element non-uniformity and image retention problems.

It is an object of the present invention to provide an improved display device of the kind described in the opening paragraph.

It is a further object of the present invention to provide a display device in which the aforementioned problems are alleviated at least to some extent.

According to the present invention, there is provided an active matrix display device of the kind described in the opening paragraph wherein each connection conductor line extends from one side of the array to a connection point at which it is connected to its associated address conductor of the other set, and wherein a complementary conductor line is provided corresponding to each connection conductor line which extends from adjacent the connection point to the opposite side of the array and is connected to a reference signal source.

The provision of the complementary conductor lines in association with the connection conductor lines leads to the aforementioned problems with unwanted display artefacts being reduced significantly, and hence improved display quality with less non-uniformity in the picture element outputs and less image retention effects. The invention stems from a recognition that certain parasitic capacitance effects introduced by the presence of connection is conductor lines are responsible for these problems. The nature of the parasitic capacitances means that picture elements at the locations of the connection points and coupled to the address conductors connected at those points to the connection conductor lines experience different consequences than picture elements elsewhere in the array. Where the one set of address conductors comprises the column address conductors and the other set comprises the row address conductors, to which data signals and selection signals are applied respectively, then the presence of the connection conductor lines means that the kickback effects for picture elements at the connection point locations will differ, with the result that, for a given applied data signal voltage, their display outputs will be different to display outputs from the other picture elements. Moreover, these picture elements can be affected by a consequential rms DC voltage producing ageing effects in the LC material and an image retention problem.

The complementary conductor lines serve in effect as "dummy" connection conductor lines so that, for the picture elements associated with one connection conductor line and its associated complementary conductor line, the picture elements up to the connection point and the picture elements after the connection point all have a similar environment in terms of the parasitic capacitances present at their respective locations.

Accordingly, with an appropriate reference signal applied to the complementary lines, for example corresponding to the non-select level of a row drive waveform (comprising select and non-select voltage levels) where the connector conductor lines carry such a waveform to the row address conductors, it is ensured that all picture elements experience substantially similar kick back effects.

The number of rows of picture elements in the array may differ from the number of columns and the number of picture element columns (or rows) may then exceed the number of connection conductor lines required. In such cases, a complementary conductor line may be provided for each of the picture element columns (or rows) not associated with a connection conductor line, which line extends from one side of the array to the other so that the picture elements concerned likewise experience a similar capacitive environment to those having associated connection conductor lines, and thereby ensure picture element uniformity over the array.

The complementary conductor lines and the connection conductor lines are preferably provided in the same manner, for example with the connection conductor lines and their respective associated complementary conductor lines being formed by patterning a deposited layer of conductive material into lines each with a discontinuity along its length, at an appropriate location determined by its respective connection point, to define two portions constituting the connection conductor line and complementary conductor line respectively. It is conceivable that the connection and complementary conductor lines could be formed in separate process stages, for example from different deposited layers, and with the positioning of the two lines in relation to the picture element electrodes etc. not being identical. However, besides complicating the manufacturing processes, this approach might lead to significant differences in the nature of the associated capacitances.

The connection and complementary conductor lines may extend beneath the picture element electrodes and be separated therefrom by a dielectric layer. Alternatively, these lines may be arranged to extend laterally adjacent the picture element electrodes, for example alongside the address conductors of the one set. This would reduce the capacitance between these lines and the picture element electrodes which is an important factor. This can be beneficial also in the case of the display device being a transmissive type with the picture element electrodes comprising a transparent conductive material, such as ITO, as otherwise the lines would similarly need to be of transparent material when placed underneath the picture element electrodes. However, positioning these lines laterally adjacent the picture element electrodes could result in a decrease in picture element aperture.

Although applicable particularly to active matrix liquid crystal displays devices, the invention may advantageously be applied also to different kinds of active matrix display devices using other electro-optic materials for the picture elements, such as electrophoretic, electrochromic and electroluminescent (both so-called polymer and organic type) display devices.

Embodiments of active matrix display devices in accordance with the invention, and in particular liquid crystal display devices, will now be described, by way of example, with reference to the accompanying drawings, in which.

It should be understood that the Figures are merely schematic and are not drawn to scale. The same reference numbers are used throughout the Figures to denote the same or similar parts.

Figure 1:
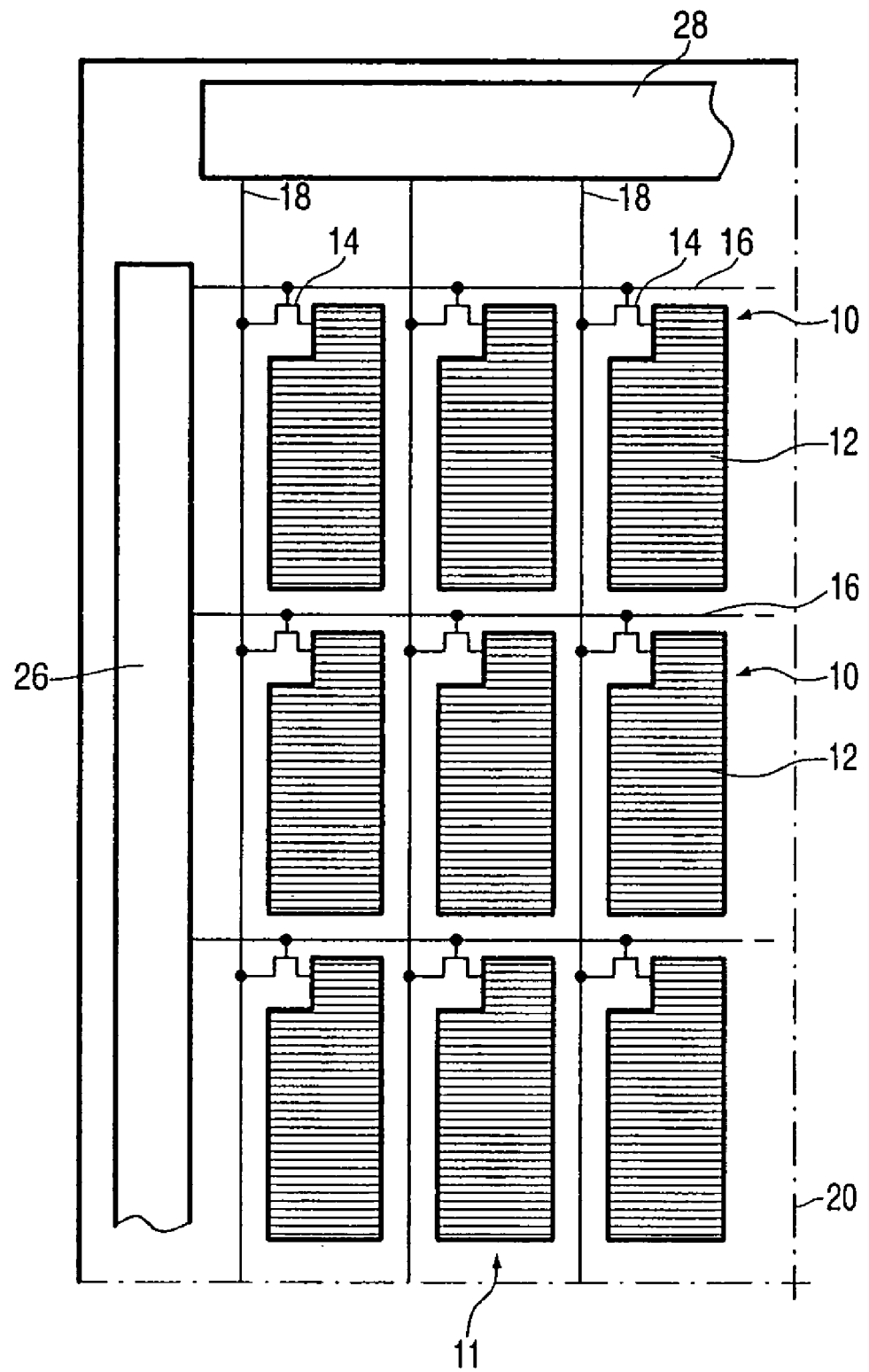
FIG. 1 illustrates schematically the arrangement of a typical group of adjacent picture elements in a conventional AMLCD configuration.

Referring to FIG. 1, there is shown part of a conventional form of active matrix liquid crystal display device having a matrix array 11 of individually—addressable picture elements 10, each comprising a discrete picture element electrode 12 and an associated switching device in the form of a thin film transistor, TFT, 14, which may be of amorphous silicon (a-Si) or polysilicon type. The general construction and operation of such a device is described, for example, in U.S. Pat. No. 5,130,829 to which reference is invited and whose disclosure in these respects is incorporated herein. Briefly, the picture element electrodes 12 are organised in rows and columns and first and second, mutually-perpendicular, sets of address conductors, namely row, selection, address conductors 16 and column, data, address conductors 18, extend between the picture element electrodes 12 with each electrode being located adjacent the intersection of a respective pair of address conductors. The picture element electrodes, sets of address conductors and TFTs are all carried on a support 20, for example a glass plate. A second support, for example again a glass plate, (not shown) is arranged overlying, and parallel to, the support 20 and carries a common electrode. The two supports are spaced from one another and liquid crystal material is disposed between the supports, the liquid crystal material being contained by a seal extending around the periphery of the array between the supports. Each picture element electrode together with an overlying portion of the common electrode and the liquid crystal material therebetween defines a respective display element.

To drive the picture elements, row and column drive circuits 26 and 28 are connected to the sets of row and column address conductors 16 and 18 respectively at their one ends. The row drive circuit 26 provides selection (scanning) signals to each of the row address conductors 16 in sequence to turn on each row of TFTs 14 in turn, and the column drive circuit 28 provides data (video) signals, obtained for example by sampling an input video signal, to each of the column address conductors 18 in synchronism with row selection. The drive circuits 26 and 28 normally are provided in the form of ICs which may be mounted on regions of the support 20 between two, adjacent, sides of the array and respective edges of the support, as depicted in FIG. 1, or alternatively mounted on foil or tape when using COF (Chip on Foil) or TCP (Tape Carrier Package) techniques with the foil or tape then being interconnected with the sets of address conductors at peripheral regions along two adjacent sides of the support. In the case of a polysilicon AMLCD, the drive circuits may instead be actually fabricated on the peripheral region of the support 20 using the same processes, and, at the same time, as the active matrix circuitry comprising the TFTs and address conductors, etc, so as to be fully integrated on the support.

Figure 2:
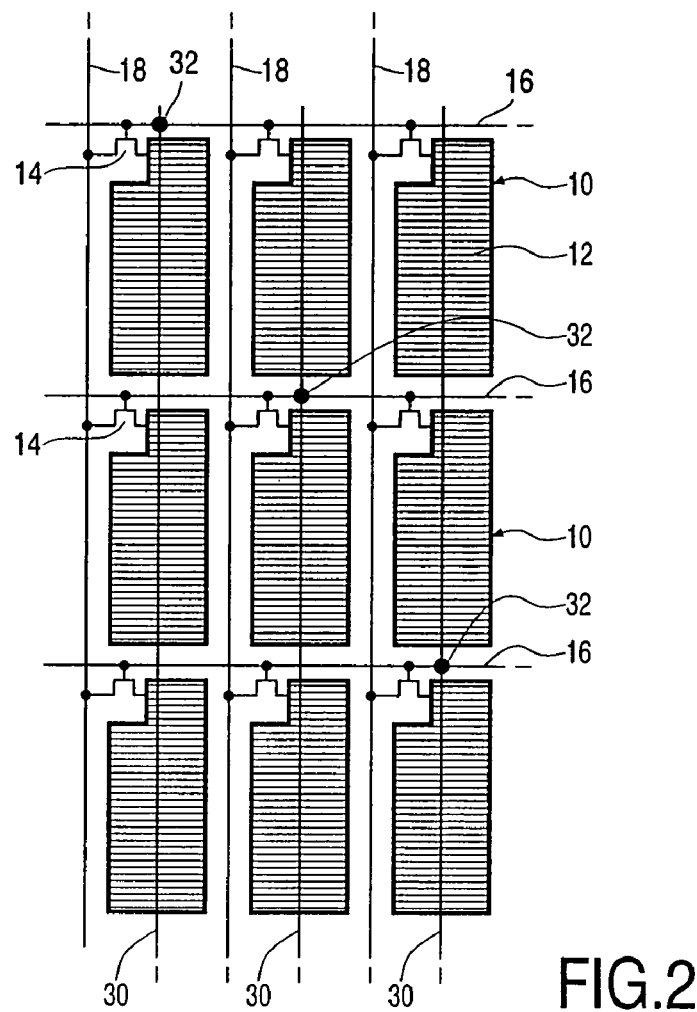
FIG. 2 illustrates schematically the arrangement of a typical group of picture elements in an alternative AMLCD configuration.
Figure 3:
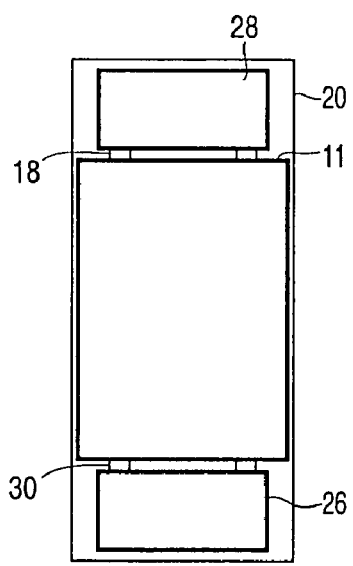
FIG. 3 shows schematically a possible arrangement of drive circuits in the type of AMLCD shown in FIG. 2.

As will be appreciated, the need to dedicate peripheral portions of the support along two adjacent sides for the mounting of ICs or provision for interconnections with tapes or foils can be limiting as the overall size of the support 20 both in height and width needs to be significantly larger than the array to accommodate such. An alternative arrangement has been proposed which offers advantages in this respect. FIG. 2 shows part of a picture element array using the principles of this alternative arrangement. The array similarly has picture element electrodes 12 and associated TFTs 14 connected to sets of row and column address conductors 16 and 18. In this arrangement, however, the row address conductors 16 terminate immediately adjacent opposed edges of the picture element array and a set of connection lines 30, in the form of supplementary column conductors extending parallel to the column address conductors 18, are provided, each of which lines 30 extends from one side of the array to the opposite side along a respective column of picture element electrodes 12 and is connected to a respective one of the row address conductors 16 at a connection point 32. The position of this connection point corresponds to the cross-over between the 30 and its associated address conductor 16 and differs for each line. The supplementary connection lines 30 enable the row selection signals to be applied to the row address conductors 16 from a side of the array corresponding to, or opposite to, the side at which the data signals are applied to the column address conductors 18, for example as shown in the schematic, plan, view of the display device in FIG. 3 with row and column drive circuit ICs 26 and 28 in this case being carried at respective edge parts of the support 20 on opposing sides of the picture element array 11 and the ends of the column address conductors 18 and the lines 30 being connected respectively to the column and row drive circuits ICs. As a consequence, there is no need to devote a peripheral edge region of the support 20 along a side adjacent the ends of the set of row address conductors 16 for the row drive circuit IC or interconnection thereto. This means that a reduction in the area of the support for a given display size is possible, resulting in a greater number of active plates for display devices being obtained from, for example, a single processed, initially large area, glass sheet. Also, the symmetrical nature of the display device, with minimal excess area at opposing sides, is beneficial in many applications, particularly for small area display devices as used in mobile phones and the like.

Examples of display devices of this kind and further advantages obtained by using such an arrangement, are described in European Patent Application No 0 1200 466.9 to which reference is invited and whose contents are incorporated herein.

In the paper by R. G. Greene et al entitled "Manufacturing of Large Wide—View Angle Seamless Tiled AMLCDs for Business and Consumer Applications", IDMC 2000, pages 191–194, there is described an LC panel in which row and column address conductors are contacted from the same side of the array and which uses supplementary connection lines with a view to enabling individual panels to be tiled together to produce large area display more conveniently. In this panel, the supplementary connection lines extend adjacent the column address conductors and between adjacent columns of picture element electrodes.

In the arrangement shown in FIG. 2, the lines 30 each extend beneath, and approximately centrally of, a column of picture element electrodes. In the case of the display device being a reflective display using reflective metal electrodes 12, the lines may be formed from a metal, such as aluminium, and for convenience from the same deposited metal layer as the column address conductors 18. In the case of a transmissive display in which the electrodes 12 comprise a transparent conductive material such as ITO, the lines 30 are preferably similarly formed of transparent conductive material.

In operation of this kind of display device unwanted display artefacts can occur, especially picture element non-uniformities. It has now to be determined that these artefacts are to a large extent caused by the effects of capacitances introduced by the presence of the supplementary connection lines 30.

An embodiment of display device according to the invention, in which such artefacts are at least reduced significantly, will now be described with reference to FIG. 4 which shows a portion of the active matrix plate of the device similar to FIG. 2 but with certain modifications. As will be apparent, conductors equivalent to the connection lines 30 are here rendered electrically discontinuous at the regions of their respective connection points 32 so as to form in each case a first portion 30' terminating at or closely adjacent to the connection point and a second portion 30". Each portion 30' up to the connection point 32 is connected at its end adjacent one side of the array to the row drive circuit 26 and this portion serves the same function as the line 30 previously in supplying a selection signal waveform to its associated row address conductor 16.

The remaining portion 30", electrically separate from the portion 30', extends from closely adjacent the end of the first portion 30' and the connection point 32 up to the opposing side of the array where it is connected via a conductor line 38 common to all of these portions 30", to a reference signal source 40.

The portions 30" preferably are formed simultaneously with the portions 30' and in the same manner as the lines 30 previously generally as single lines extending from one side of the array beneath respective columns of picture elements electrodes 12 to the opposite side but with a break being introduced in each line immediately adjacent its connection point by appropriate patterning of the deposited conducting layer used to form the lines, thereby defining an associated pair of electrically disconnected portions 30' and 30". Alternatively, however, the set of portions 30' and the set of portions 30" could instead be formed independently of one another in different processes if desired. In other words, each associated pair of portions 30' and 30" could be equivalent to a conductor line 30 as before but formed with a break along its length, or formed as separate components. In either case, the portions 30' constitute connection conductor lines corresponding to the lines 30 and the portions 30" constitute complementary conductor lines, each of which is associated with a respective connection conductor line 30' and column of picture element electrodes 12.

The breaking, in effect, of the conductor lines 30 to define connection lines 30' and complementary lines 30" in this manner leads to a significant reduction in, unwanted display artefacts for reasons which will now be explained with reference to FIGS. 5 and 6 which show schematically the equivalent circuits of typical parts of the picture element arrays, comprising a group of nine adjacent picture elements 10, labelled 1 to 9, using the configurations of FIGS. 2 and 4 respectively.

Figure 5:
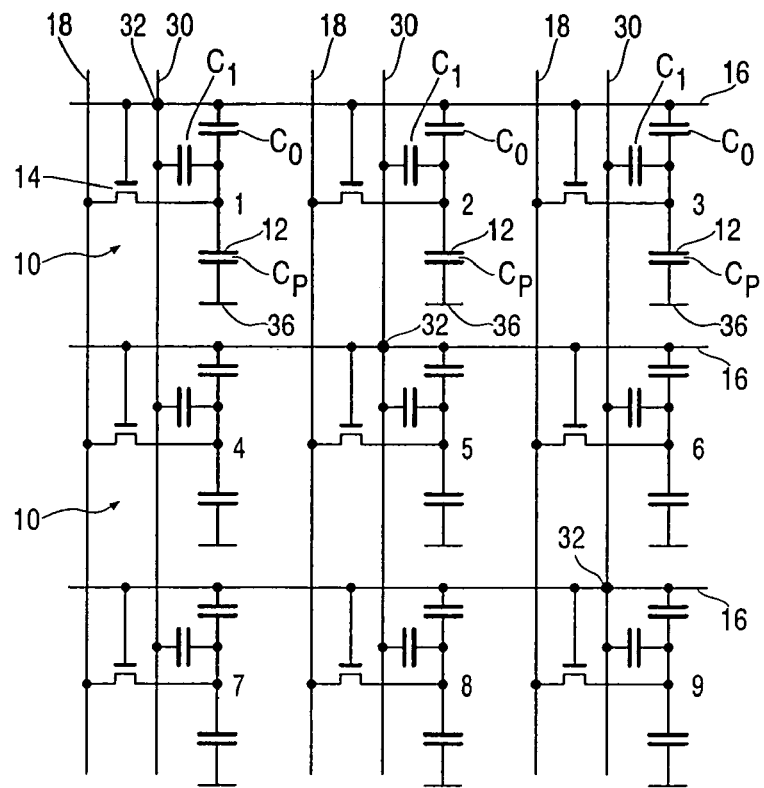
FIGS. 5 and 6 show equivalent electrical circuits for groups of picture elements in the devices of FIGS. 2 and 4 respectively.

Referring to FIG. 5, the presence of the connection conductor lines 30 introduces parasitic capacitance at each picture element 10, most notably a capacitance $C_1$ between the picture element electrode 12 and the underlying portion of the line 30. A further, less important, parasitic capacitance (not shown) is formed between a line 30 and a row address conductor 16 at their cross-over. There typically exists in any event a parasitic capacitance between the picture element electrode 12 and its associated row address conductor 16, due to, inter alia, TFT gate/source capacitance, which here is labelled Co. The capacitance of the LC display element itself is shown at Cp which consists of the LC capacitance and that of an associated storage capacitor, Cs, as normally provided and usually in parallel with the LC element, with the common electrode carried on the opposing support here being referenced at 36.

The effect of the capacitance $C_1$ at picture element locations corresponding to the connection points 32, i.e at picture elements 1, 5 and 9 in FIG. 5 that are connected to the row address conductor 16 in which the connection point in that column occurs, is important as it appears in parallel with the usual parasitic capacitance Co. In all other picture elements it appears in parallel with the storage capacitance Cs. The kickback error voltage resulting from the falling row transition when the waveform applied to a row address conductor drops from a selection voltage level Von (at which the TFTs are turned on to select the picture elements) to a lower, hold, level Voff (at which the TFTs are held off) are coupled onto the picture element capacitances Cp through Co but in the case of the picture elements 1, 5 and 9 this kickback error voltage is coupled through both Co and $C_1$ because the transitions on a row address conductor 16 are all present also on the associated connection conductor line 30. For these picture elements, the kickback voltage, $V_{kb}$ is given by the formula:-

$$V_{kb}=[V_{on}-V_{off}] \times (C_1+Co)/(Co+Cp) \qquad (1)$$

For all other picture elements, the kickback voltage is given by the formula-:

$$V_{kb}=[V_{on}-V_{off}] \times Co/(Co+Cp+C_1) \qquad (2)$$

Thus, the kickback for picture elements 1, 5 and 9 and other picture elements at the locations of the connection points is different to that for all other picture elements. With typical drive voltage levels and capacitance values for a display device using a-Si type TFTs, this difference may, for example, be around 1.5V for a small display device. Besides this kickback difference causing non-uniformity by virtue of the operation of the picture elements at the connection point locations producing different brightness levels from other picture elements for a given data signal value, the kickback voltage can also appear as an rms DC voltage on all the picture elements which can cause ageing and image retention problem as well.

Figure 4:
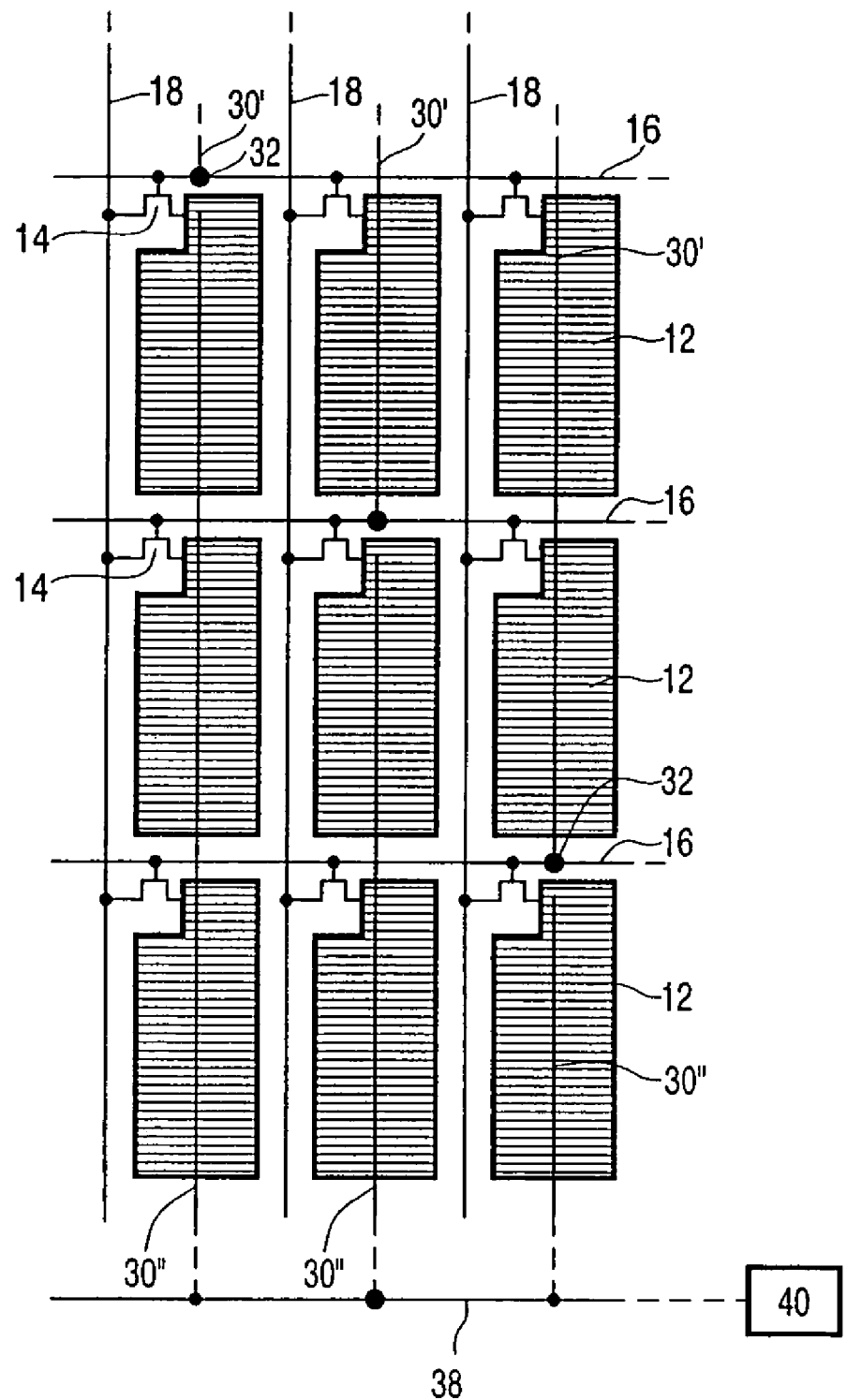
FIG. 4 illustrates schematically a typical group of picture elements in an embodiment of AMLCD according to the present invention.

Terminating the connection conductor lines 30' at their respective connection points 32 as in the arrangement of FIG. 4 means that the picture elements previously affected by the extra capacitance to the row address conductor 16 are now not affected in the same way since the capacitance $C_1$ is no longer present. Simply terminating the lines in this manner would, though, be unsatisfactory as the capacitive environment of the picture elements in the column beyond the connection point would then be different from those up to the connection point and consequently image degradation would be likely to occur. The complementary lines 30" serve to avoid this possibility by ensuring that the picture elements in a column all share a similar capacitive environment. In operation, these complementary lines 30" are held, via the common conductor line 38, at a reference voltage level provided by the source 40 which, depending on the particular kind of drive scheme employed, may, for example, correspond to ground or the hold level of the selection signal waveform applied to the row address conductors, or to the same AC voltage signal as applied to the common electrode 36 carried on the opposing support if the drive scheme employed uses common electrode modulation.

Figure 6:
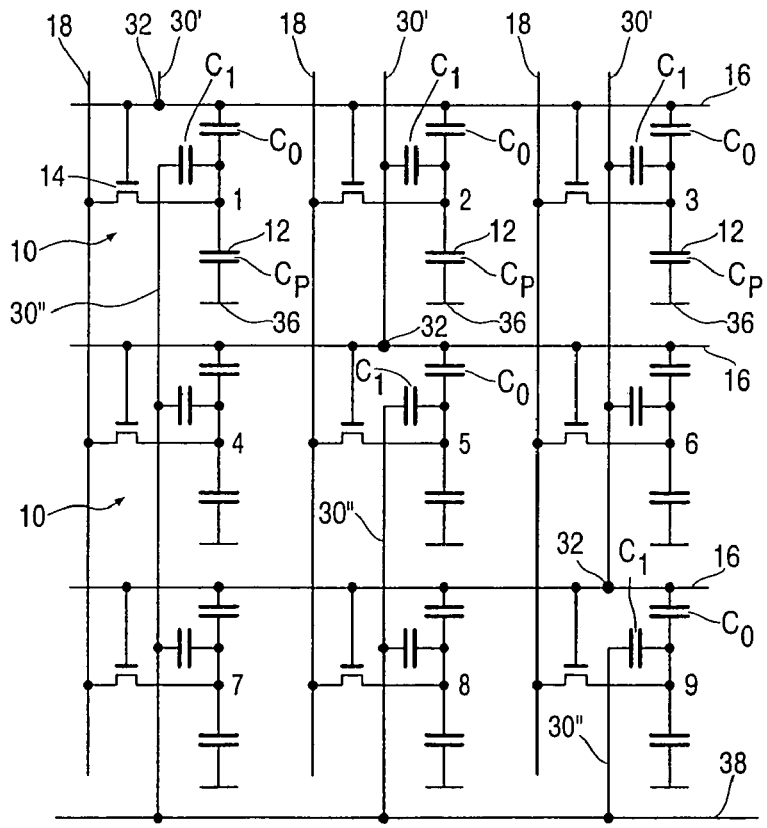

Referring to FIG. 6, which shows the effective equivalent circuit of a few picture elements in the device of FIG. 4, and comparing this with the circuit of FIG. 5, it can be seen that the picture elements 10 at the locations of the connection points 32, here numbered 1, 5 and 9 as before, have the same capacitive coupling to their associated row address conductors 16 as other picture elements and that the parasitic capacitance $C_1$ is no longer in parallel with the parasitic capacitance Co between the picture element electrode 12 and the row address conductor 16. Hence the transitions on the conductors 16 and lines 30" coupled on to the electrodes 12 of these particular picture elements will be substantially the same as in all other picture elements, and the kickback experienced by all picture elements will likewise be substantially the same. The kickback level in this case is given by:-

$$V_{kb}=[V_{on}-V_{off}] \times Co/(Co+Cp+C_1) \qquad (3)$$

Because a similar kickback is experienced by all picture elements, the effects of such will be substantially the same on all picture elements and non-uniformities previously found with picture elements 1, 5 and 9 will no longer be present.

In certain display devices, it may be that the number of columns in the picture element array is greater than the number of rows and so not all the picture element columns have-an associated connection conductor line 30'. In this case, the picture element columns not having an associated connection line can be provided instead solely with a complementary conductor line 30" which extends along the length of the entire column from one side of the array to the other. This will ensure that the picture elements in these columns experience a similar capacitive environment to picture elements, in columns having a connection line.

Figure 7:
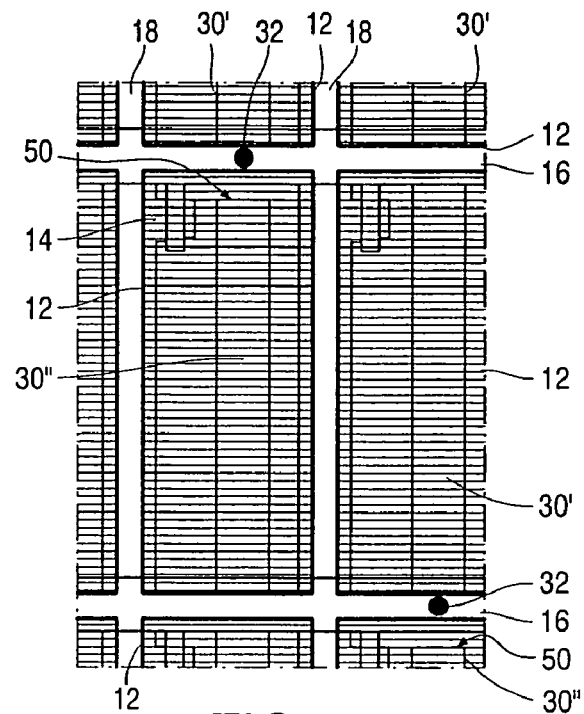
FIG. 7 is a schematic plan view of a picture element in the device of FIG. 4 illustrating, the layout of components.

The structure of one complete picture element at the location of a connection point 32 is shown schematically in plan in FIG. 7. The electrode 12 in this example structure is arranged so as to overlap slightly immediately adjacent row and column address conductors 16 and 18 with an intervening dielectric layer (not shown) being provided. The connection line 30' and its associated complementary line 30" comprise respective, aligned, strips of conductive material extending beneath the row address conductors 16 and the picture element electrodes 12 in a column and arranged near the centreline of the electrodes 12. The paired lines 30' and 30", and likewise the corresponding lines associated with the other picture element columns, are formed from the same deposited layer of conductive material by appropriate photolithographic patterning of that layer in a manner similar to that used to create the row and column address conductors. Each line 30' and its respective complementary line 30" are here formed in the manner of a single strip of conductive material which extends between opposite sides of the array and in which a short discontinuity is defined, as shown at 50, immediately next to the row address conductor 16 at the connection point 32 which separates electrically the parts constituting the lines 30' and 30" from one another. At the connection point, a via is formed in the dielectric layer separating the row address conductor 16 from the underlying line 30' prior to the deposition and patterning of the layer forming the row address conductors such that, when formed, they electrically connect with the line 30' through the via.

In a transmissive type of display device in which the electrodes 12 comprise transparent conducting material such as ITO, the lines 30' and 30" are preferably formed of the same material. In a reflective type of display device in which the electrodes are formed of an opaque, reflective, metal, then the lines 30' and 30" may be formed of an opaque metal, such as aluminium, and for simplicity may be formed from the same deposited metal layer as the column address conductors 18.

Figure 8:
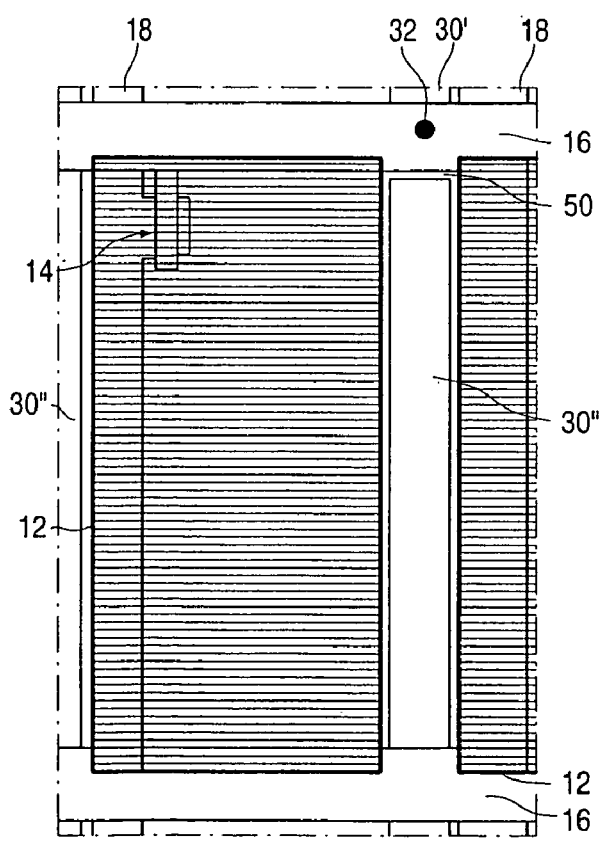
FIG. 8 shows an alternative layout for components.

Although the lines 30' and 30" are shown as extending beneath the column of picture element electrodes 12 in the above example, this need not be the case. The lines may be arranged at one side of the column of picture element electrodes 12 and alongside a column address conductor 18, as shown in the plan schematic view of a picture element in FIG. 8. This alternative arrangement has the advantage that the aforementioned parasitic capacitance $C_1$ is now considerably reduced. However, there is a disadvantage in that the effective picture element aperture size, and hence aperture, is also reduced, in the case of a transmissive display device.

While generally rectangular picture element arrays are used in the above described examples, it is envisaged that the array may be of a different shape, for example semicircular. The ability to provide row and column drive circuits, or connection regions therefor, along the same side or opposing sides of the array, allows greater freedom in the choice and implementation of array shapes utilised.

While the invention has been described in relation to an AMLCD in particular, it is envisaged that it can be applied to similar advantage in other types of active matrix display devices such as AMLED display devices.

From reading the present disclosure, other modifications will be apparent to persons skilled in the art. Such modifications may involve other features which are already known in the field of active matrix display devices and component parts therefor and which may be used instead of or in addition to features already described herein.

The invention claimed is:

1. An active matrix display device having a row and column array of picture elements, each comprising a picture element electrode and an associated switching element, carried on a support, first and second sets of address conductors connected to the picture elements and extending in the row and column directions respectively through which the picture elements are addressed, and a set of connection conductor lines carried on the support, each of which extends in the direction of, and between, a respective adjacent pair of the address conductors of one set and is connected to a respective one of the other set of address conductors, and via which addressing signals are supplied to the other set of address conductors, wherein each connection conductor line extends from a side of the array to a connection point at which it is connected to its associated address conductor of the other set, and a complementary conductor line is provided corresponding to each connection conductor line which extends from adjacent the connection point to the opposite side of the array and which is connected to a reference signal source.

2. A device according to claim 1, wherein the connection and complementary conductor lines extend beneath the picture elements electrodes and are separated therefrom by a dielectric layer.

3. A device according to claim 1, wherein the connection and complementary conductor lines extend laterally adjacent the picture element electrodes.

4. A device according to claim 3, wherein a connection conductor line and its associated complementary conductor line extend alongside a respective address conductor of the one set.

5. A device according to claim 1, wherein each connection conductor line and its associated complementary conductor line are provided as a single conductor line extending between opposing sides of the array having a discontinuity along its length adjacent the connection point.

6. A device according to claim 1, wherein a drive circuit is connected to the set of connection conductor lines for supplying addressing signal waveforms comprising selection and non-selection voltage levels for the switching elements of the picture elements.

7. A device according to claim 6, wherein the reference signal for the complementary conductor lines corresponds to the non-selection voltage level.

8. A device according to claim 1, wherein the picture elements comprise liquid crystal picture elements.

9. A device according to claim 2, wherein each connection conductor line and its associated complementary conductor line are provided as a single conductor line extending between opposing sides of the array having a discontinuity along its length adjacent the connection point.

10. A device according to claim 3, wherein each connection conductor line and its associated complementary conductor line are provided as a single conductor line extending between opposing sides of the array having a discontinuity along its length adjacent the connection point.

11. A device according to claim 4, wherein each connection conductor line and its associated complementary conductor line are provided as a single conductor line extending between opposing sides of the array having a discontinuity along its length adjacent the connection point.

12. A device according to claim 2, wherein a drive circuit is connected to the set of connection conductor lines for supplying addressing signal waveforms comprising selection and non-selection voltage levels for the switching elements of the picture elements.

13. A device according to claim 3, wherein a drive circuit is connected to the set of connection conductor lines for supplying addressing signal waveforms comprising selection and non-selection voltage levels for the switching elements of the picture elements.

14. A device according to claim 4, wherein a drive circuit is connected to the set of connection conductor lines for supplying addressing signal waveforms comprising selection and non-selection voltage levels for the switching elements of the picture elements.

15. A device according to claim 5, wherein a drive circuit is connected to the set of connection conductor lines for supplying addressing signal waveforms comprising selection and non-selection voltage levels for the switching elements of the picture elements.

16. A device according to claim 2, wherein the picture elements comprise liquid crystal picture elements.

17. A device according to claim 3, wherein the picture elements comprise liquid crystal picture elements.

18. A device according to claim 4, wherein the picture elements comprise liquid crystal picture elements.

19. A device according to claim 5, wherein the picture elements comprise liquid crystal picture elements.

20. A device according to claim 6, wherein the picture elements comprise liquid crystal picture elements.

* * * * *